May 29, 1951 W. K. GREGORY 2,555,125
AIR FILTER MEDIA
Filed May 15, 1947 2 Sheets-Sheet 1
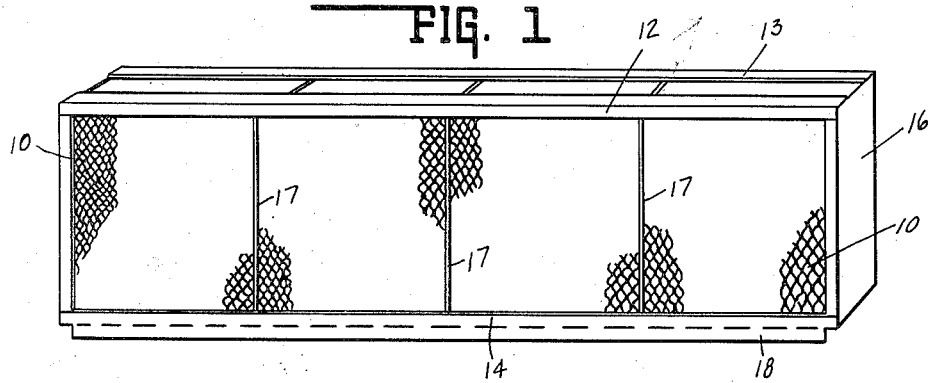
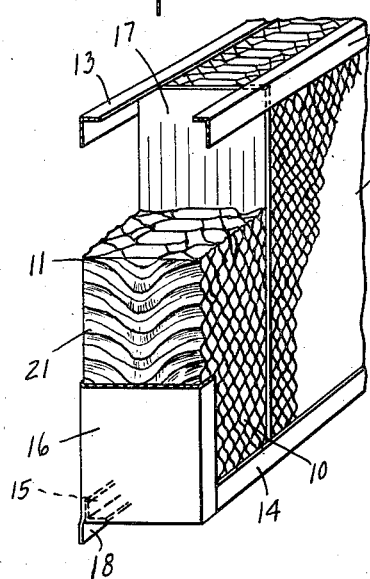
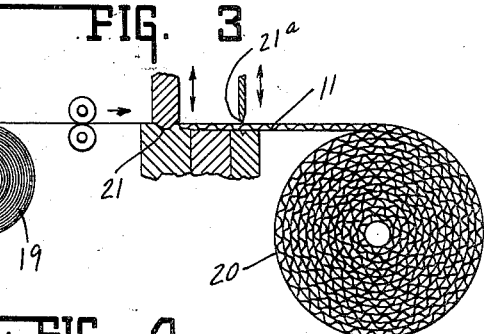
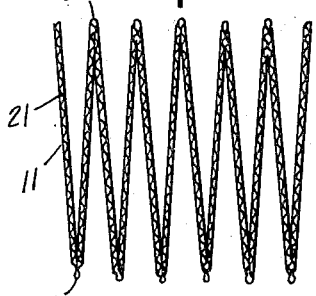
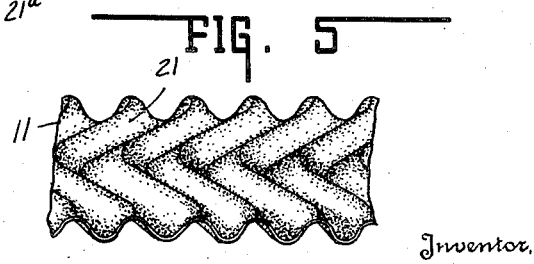
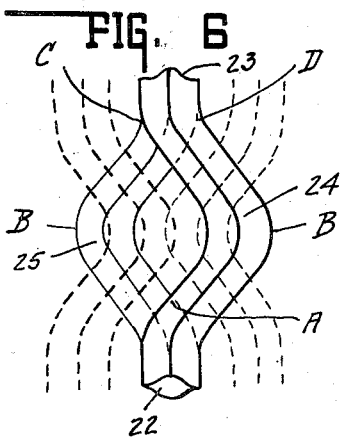
Inventor,
WILLIAM K. GREGORY.
By Lockwood, Goldsmith & Galt,
Attorneys Patented May 29, 1951

2,555,125

UNITED STATES PATENT OFFICE 2,555,125

AIR FILTER MEDIA

William K. Gregory, Louisville, Ky., assignor to Continental Air Filters, Inc., Louisville, Ky., a corporation Application May 15, 1947, Serial No. 748,163

8 Claims. (Cl. 183—71)

This invention relates to the construction of an air filter applicable for use in self-cleansing filtering devices, particularly the construction of the filter media comprising a series of corrugated plates.

The filter media of this invention is of that character involving the inertia principle wherein air is caused to pass through a series of viscous coated sinuous channels for trapping dust particles.

One feature of the invention resides in the compact association of a plurality of pre-formed metal plates so associated relative to each other as to provide divergent sinuous channels. Said channels are formed by the association of a pair of plates in such relation as to cause the restricted air stream entering their respective inlets to be divided into minor air streams, each minor stream being oppositely directed relative to the other through a sinuous path each having a plurality of impact dust trapping locations. Thus, each of the minor air streams is caused to change its direction of flow at several points in its travel, causing the dust particles to impinge upon the viscous treated surface of its channel to thereby effect separation from the air before passing from their respective outlets.

In one form of the invention the opposed divergent sinuous channels are so related as to form joint or common inlets or outlets with intermediate V-shaped oppositely directed channels, whereby upon the air entering the common inlet it impinges on the surface of the channels where they start to diverge and again wherein the opposed channels change directions at their apex, and still again where they converge into the common outlet. This is accomplished by arranging the respective corrugated plates forming the sinuous channels in opposed face to face relation such as by folding them together in an accordion pleated fashion.

However, in other forms of the invention, the plates may be variously associated with or without interlining by separators wherein the air inlet and outlet between the plates may be continuous and sinuous in form or separated as between adjacent plates. In much modifications it is the purpose of the invention to provide a series of impact points throughout the channels formed by the respective plates in their association such that dust will be trapped at such locations through a plurality of changing directions of the air current.

This is accomplished by forming the corrugations in each plate extending directly inwardly a short distance from the opposite edges to provide impact points or locations before being directed angularly through the intermediate portions of the channels which are V-shaped.

The full nature of the invention will be understood from the accompanying drawings and the following description and claims:

Fig. 1 is a perspective view of one of the filter units.

Fig. 2 is a perspective view of a portion of one of said units with parts broken away and removed.

Fig. 3 is a schematic illustration of the method of forming the media plates with channels.

Fig. 4 is a schematic illustration of one method of assembling the media plates.

Fig. 5 is a perspective view of one of the media forming plates.

Fig. 6 is a schematic illustration of the directions of air flow through the channels of the media arranged to provide common inlets and outlets.

Figure 7:
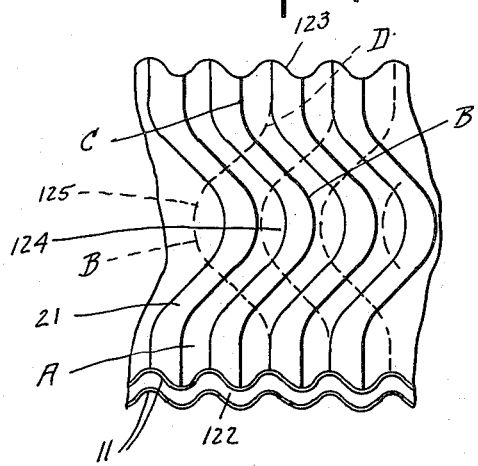
Fig. 7 is a perspective view of a pair of media plates in modified association with their respective channels so related as to form a continuous corrugated inlet and outlet.

In the drawings there is shown a filter unit comprising a filtering media generally indicated at 10, in the form of a series of corrugated imperforate plates 11 clamped and secured in assembled relation by a frame structure. The frame structure comprises a pair of upper angle bars 12 and 13 and a pair of lower angle bars 14 and 15 which are secured together by end plates 16 between which the plates 11 of the filter media 10 are clamped in compact open face to face relation with no interposed lines or similar separating obstruction. At spaced intervals there are provided reinforcing plates 17 secured at their ends by welding or the like to the respective angle bars for retention of the plate 11 and structural bracing of the unit.

Along the outer surface of the channel bar 15 there is secured a depending baffle plate 18 arranged to overlap the upper edge of the next lower unit to prevent air from passing between the respective units. The filter media 10 generally presents a honeycomb surface on each side of the unit comprising a series of air inlets and outlets, each formed by the related edges of the corrugated plates 11 when clamped together in their open face to face relation.

The plates 11 may be formed from a continuous strip of metal or a similar suitable material, such as aluminum, by stamping the strip as it is unwound from a roll 19 onto a roll 20, as illustrated in Fig. 3. The strip as it progresses from one roll to the other is stamped to form a series of nesting corrugations 21 having their intermediate portions somewhat V-shaped in cross section and sinously curved somewhat wave-like transversely of the strip. As said corrugations are formed the strip is creased or cut to length at 21a corresponding to the width of the filter media 10. The corrugated strip of metal may then be reversely folded at 21a in an accordion pleated manner to bring their corresponding surfaces in open face to face relation so that the wave-like curvature of the respective corrugations 21 extend in opposite directions, as shown in Fig. 4. In this manner the valleys of the opposed corrugations 21 are brought into open mating relation to jointly provide a common inlet at one side and a corresponding common outlet at the other side, thereby forming the exposed honeycomb surfaces of the media 10.

With the plates thus assembled by folding the corrugated strip in accordion pleated fashion, their joint inlets and outlets are connected by intermediate divergently curved and separated channels, as illustrated in Fig. 6. Therein, the common inlet is indicated at 22 and the common outlet at 23, each opening into end portions 22a and 23a of the respective channels. The corrugations of one of the plates 11 form a sinuous channel indicated at 24 connecting the inlet and outlet 22, 23. The adjacent plate with its reversely directed corrugations forms a separate channel 25 which likewise connects the same inlet 22 with the same outlet 23 of the channel 24. The corrugations, and therefore said channels, are so curved as to provide a sinuous path for multiple changes in the direction of flow of the air passing therethrough. Thus, the main air stream is divided into innumerable restricted air streams, each entering a common inlet 22 and passing through an end portion 22a. The restricted air streams are thereupon each divided into smaller or minor air streams upon entering the intermediate portions of the channels, impinging against the oppositely curved walls of the respective channels 24, 25 at the point A. One minor air stream upon leaving end portions 22a is then directed to the right and one to the left into channels 24, and 25, respectively. At the points B in the intermediate portion of each of said channels the direction of flow is again altered, the air in the channel 24 then being directed to the left and the air in the channel 25 to the right until they impinge at points C and D, respectively, before converging to pass through the end portion 23a and the common outlet 23. To provide the multiple changes in direction of flow and points of impingement A, B, C and D, the end portions 22a and 23a extend at an angle to the respective legs of the V-shaped intermediate portions of the channels.

In this type of filter, the imperforate surface of the plates is provided with a viscous coating, such as a mineral oil, and by reason of the inertia of the dust particles carried through the angularly disposed end portions and the V-shaped intermediate portions of the channels 24, 25, they are caused to impinge at the points A, B and C or the points A, B and D for entrapment by the viscous film.

It will therefore be observed that a most effective and economical filtering media is provided by originally forming a strip, which is later folded into the respective plates 11, with a series of nesting corrugations all curved in the same direction. Upon bringing the corrugations together in reverse mating relation by folding the strip in an accordion pleated fashion with its corresponding faces abutting, and the ends of the corrugations having their peaks and valleys in opposed relationship, they jointly form common inlets and outlets with divergent channels extending in angular relationship to each other as shown in Figs. 4 and 6.

In the modified arrangement of the corrugated plates 11 as illustrated in Fig. 7, it is noted that the respective inlets and outlets provided by their corrugations 21 lay one over the other so that instead of the honeycomb form of inlet and outlet surface there is provided a continuous wave-like inlet 122 and a similarly formed outlet 123. However, the air streams will be similarly received and directed in opposite directions in the manner indicated in Fig. 6 wherein the air entering the inlet 122 will be divided into the respective channels 124 and 125, thus directing the air currents in opposite directions while providing the impact points or locations indicated at A, B, C, and D.

Figure 8:
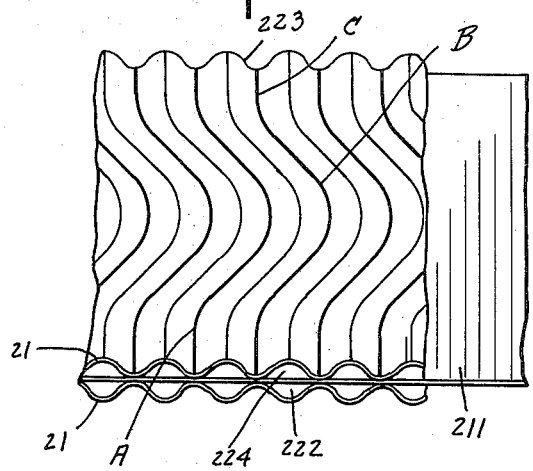
Fig. 8 is the same as Fig. 7 showing a further modification wherein the media plates are separated by an interliner and so associated that their respective channels extend in the same direction.

In the modified arrangement of the plates 11 shown in Fig. 8, the nested corrugations 21 may extend in the same direction by associating the corresponding sides of the plates together instead of in opposed relation as in the preceding modification. However, in this form, to prevent the corrugations of one plate from seating in those of the adjacent plate, it is necessary to provide an interliner or separator plate 211 therebetween.

However, there will be provided by reason of the form of the corrugations as above described similar air impact points or locations as at A, B, C, and D in the manner above described with respect to Figs. 6 and 7 upon the air entering the separated inlet 222, being divided, and brought into impact engagement with the surface of the corrugations at the several impact points and discharged from the separated outlets 223. In this form, however, air currents will not be divergent, but will be directed in the same direction by the similarly directed channels 224.

It is advantageous in handling the air at the higher velocities such as above 450 feet per minute to employ separator plates 211 between the plates 11 such as to provide a true sinuous air passage which causes a minimum amount of turbulence and has less resistance to air flow at higher velocity. Thus, the form of the invention as disclosed in Figs. 2, 6, and 7 create less air resistance than the modification of Fig. 8 embodying the separator plate at air velocities of around 400 feet per minute or under, while at the higher velocities less air resistance is created with the employment of the separator plate than without. Thus, the modification of Fig. 8 is of value when space is limited and high air velocities are used, the low air resistance of this structure at higher velocities being the important feature of this modification.

Another feature of the modification as shown in Fig. 8 when the air filter is of the washable type, is wherein the separator plate 211 may be of absorptive material such as fiber glass cloth or felt. By utilizing an absorptive separator plate 211, it will not only serve in reducing resistance at high air velocities, but due to the fact that the material of the plate will absorb the filter liquid such as oil, it will serve as a liquid or oil reservoir. Acting as an oil reservoir, for example, in a washable filter unit, it will continuously feed additional oil to the filter media or plates as the oil carried thereby from the usual bath is absorbed by dust, thus permitting the filter media to serve as an efficient dust remover for a greater length of time than is possible in filter media without an absorptive separator plate.

The invention claimed is:

1. An air filter having a media consisting of a plurality of preformed plates embodying a nesting series of curved corrugations, and a frame structure embracing and clamping said plates against each other in face to face relation with their respective corrugations in reversed mating relation, adjacent plates having the opposite ends of their respective corrugations arranged in complementary relation to jointly provide an air inlet and outlet, and the intermediate portions of their respective corrugations being oppositely curved to define separate channels extending in angular relation to each other.

2. An air filter media comprising a plurality of corrugated plates secured in face to face relation, each of said plates having a series of corrugations formed therein, the end portions of said corrugations extending inwardly in alignment with each other and normal to each edge of the respective plates with the intermediate portions thereof formed substantially V-shaped, said plates being arranged relative to each other so that the V-shaped portions of their respective corrugations extend in opposite directions to form divergent sinuous channels between said plates terminating in unobstructed joint inlets and outlets formed by the end portions thereof.

3. An air filter media comprising a plurality of preformed plates, each embodying a nesting series of sinuous corrugations, said plates being arranged in open unobstructed face to face relation with their respective corrugations reversely curved, the opposite ends of the respective corrugations being arranged in complementary relation to jointly provide an air inlet and outlet with the reversely curved corrugations defining divergent sinuous channels extending therebetween.

4. An air filter media comprising a plurality of preformed plates, each embodying a nesting series of substantially V-shaped corrugations, said plates being packed together in open unobstructed face to face relation with their respective corrugations oppositely directed and the opposite ends thereof arranged in complementary relation to jointly provide an unobstructed air inlet and outlet between each adjacent pair of plates and the intermediate portions of their respective corrugations forming separate divergent channels extending in angular relation to each other.

5. An air filter media comprising a plurality of corrugated imperforate plates secured in adjacent faced relation to provide a series of sinuous channels, the end portions of each of said channels extending inwardly from the opposite edges of the respective plates at an angle to the intermediate portions thereof, said intermediate portions being formed substantially V-shaped to provide a plurality of angularly related changes in direction between the end and intermediate portions to provide multiple impact dust trapping locations.

6. An air filter media comprising a plurality of corrugated imperforate plates adapted to be secured in adjacent faced relation, each of said plates having a series of nesting corrugations formed therein, the end portions of each corrugation extending inwardly from the opposite edges of the respective plates at an angle to the intermediate portions thereof, said intermediate portions being formed substantially V-shaped to provide in conjunction with said end portions an air conducting channel extending from the inlet to the outlet edge of said plate and providing therein multiple points of impact and changes in direction of the air flow therethrough.

7. An air filter media comprising a plurality of corrugated imperforate plates secured in face to face relation, each of said plates having a series of corrugations formed therein, the end portions of said corrugations extending inwardly from the opposite edges of the respective plates at an angle to the intermediate portions of said corrugations, said intermediate portions being formed substantially V-shaped with said plates being arranged relative to each other so that the V-shaped portions of their respective corrugations extend in opposite directions to form divergent sinuous channels between said plates, said respective channels thereby effecting a plurality of direction changes and points of impact for the air passing therethrough.

8. An air filter media comprising a plurality of imperforate plates, each secured in adjacent faced relation, each of said plates having a series of corrugations formed therein, the end portions of said corrugations extending inwardly from the opposite edges of the respective plates at an angle to the intermediate portions thereof, said intermediate portions being formed substantially V-shaped, and an imperforate separating liner interposed between adjacent plates to provide a sinuous air passage through each of the individual corrugations having multiple points of impact by the air stream passing therethrough with minimum air resistance at the higher velocities.

WILLIAM K. GREGORY.

REFERENCES CITED

The following references are of record in the file of this patent:

UNITED STATES PATENTS

| Number | Name | Date |
|---|---|---|
| 2,019,186 | Kaiser | Oct. 29, 1935 |
| 2,190,683 | Schaaf et al. | Feb. 20, 1940 |
| 2,252,242 | Wood | Aug. 12, 1941 |
| 2,286,479 | Farr | June 16, 1942 |

FOREIGN PATENTS

| Number | Country | Date |
|---|---|---|
| 322,684 | Great Britain | Dec. 12, 1929 |
| 303,773 | Germany | Feb. 15, 1918 |
| 431,399 | Germany | July 6, 1926 |
| 107,134 | Austria | Mar. 5, 1927 |
| 142,423 | Switzerland | Nov. 17, 1930 |